US007482974B2

(12) United States Patent
Ogawa et al.

(10) Patent No.: US 7,482,974 B2
(45) Date of Patent: Jan. 27, 2009

(54) RTK-GPS SURVEY SYSTEM

(75) Inventors: Kazuhiro Ogawa, Itabashi-ku (JP); Kenichi Takasu, Itabashi-ku (JP); Shigeyuki Yamaguchi, Itabashi-ku (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 0 days.

(21) Appl. No.: 11/803,504

(22) Filed: May 15, 2007

(65) Prior Publication Data

US 2007/0268179 A1 Nov. 22, 2007

(30) Foreign Application Priority Data

May 16, 2006 (JP) ............... 2006-136277

(51) Int. Cl.
*G01S 5/14* (2006.01)
*G01C 21/00* (2006.01)

(52) U.S. Cl. .................. 342/357.08; 701/213
(58) Field of Classification Search ........... 701/213; 342/357.08
See application file for complete search history.

(56) References Cited

U.S. PATENT DOCUMENTS

| 6,185,427 B1 * | 2/2001 | Krasner et al. ........... 455/456.2 |
|---|---|---|
| 6,879,283 B1 * | 4/2005 | Bird et al. ............... 342/357.03 |
| 6,985,104 B2 * | 1/2006 | Large et al. ............. 342/357.09 |
| 7,089,113 B1 * | 8/2006 | Janky et al. .................. 701/213 |
| 2003/0154026 A1 * | 8/2003 | Miyasaka et al. ........... 701/213 |
| 2004/0044474 A1 * | 3/2004 | Miyasaka et al. ........... 701/213 |
| 2005/0105519 A1 * | 5/2005 | Koppol ....................... 370/386 |

FOREIGN PATENT DOCUMENTS

JP 2002-311124 10/2002

* cited by examiner

*Primary Examiner*—Thomas H Tarcza
*Assistant Examiner*—Harry Liu
(74) *Attorney, Agent, or Firm*—Chapman and Cutler LLP

(57) ABSTRACT

The invention is directed to an RTK-GPS survey system. The survey system includes a server (9) in an IP-VPN communication network 10 for establishing communications between base stations (16 and 17) that transmit correction data and a rover station 15 that receives the correction data. Each satellite positioning device constituting a base station and a rover station includes at least a satellite positioning unit (11) that receives radio waves from artificial satellites, a communication unit (12) that performs a communication between the satellite positioning device, and a control unit (13) that controls the satellite positioning unit (11) and the communication unit (12). The control unit (13) of the rover station 15 can receive interference information registered in the control unit (13) of each satellite positioning device of the base stations (16 and 17), and select a base station that transmits most appropriate correction data among the plural base stations.

4 Claims, 7 Drawing Sheets

RTK-GPS SURVEY SYSTEM

PRIORITY CLAIM

This application claims priority from Japanese Patent Application No. 2006-136277, filed with the Japanese Patent Office on May 16, 2006, the contents of which are incorporated herein by reference in their entirety.

BACKGROUND OF THE INVENTION

1. Field of the Invention

The present invention relates to an RTK-GPS survey system that transmits and receives control commands and correction data by using a network.

2. Description of the Related Art

As one of the interference positioning systems that precisely measure a relative location of two observational stations by using a positioning artificial satellite such as a GPS, there is a well-known kinematic positioning system (RTK-GPS survey system). See, for example, Japanese Patent Publication 2002-311124.

In the kinematic positioning system, there are two observational points, one of which is served as an already-known reference point, and the other of which is used as an unknown observational point. The observational stations located at the two observational points simultaneously receive radio waves from an artificial satellite such as a GPS to thereby measure the relative location thereof with high accuracy. Accordingly, this allows the kinematic positioning system to determine the positional coordinates of the unknown observational point from the positional coordinates of the already-known reference point. The kinematic positioning system afterward performs analysis and processing of the signals recorded at the observational points and determines the positional coordinates.

As a further advanced model of the kinematic positioning system, there is a real-time kinematic positioning system (hereafter, referred to as an RTK positioning system).

In the RTK positioning system, one observational station is fixedly located as a base station at the reference point whose coordinates are already known of the two observational points. The other observational station is located as a rover station at the observational point whose coordinates are unknown. The base station transmits observational data to the rover station, and the rover station receives the observational data transmitted from the base station as well as the positioning satellite signals. At the same time, the RTK positioning system performs analysis and processing to thereby determine the positional coordinates of the rover station in real-time.

In concrete, in the RTK positioning system as shown in FIG. 1, a base station M1 is located at an observational point A whose coordinates are already known as a reference point. A rover station M2 is located at an observational point B whose coordinates to be sought are not yet known. After finishing measurements, the RTK positioning system moves the rover station M2 as required to another observational point whose coordinates to be sought next are not yet known. The base station M1 and the rover station M2 receive positioning satellite signals (radio waves) from an artificial satellite Sa. Referring to the base station M1, the rover station M2 performs analysis and processing in real-time simultaneously with the reception of the above signals. Thus, the RTK positioning system sequentially seeks the positional coordinates of the observational point B, which are not yet known.

With respect to the RTK positioning system, an area in which the rover station M2 can refer to a specific base station M1 (hereunder, referred to as the base station reference area) is about an radius 10 km, with the base station M1 placed at the center thereof.

This is because an excessive distance between the base station M1 and the rover station M2 will make it impossible to ignore the influences of differences in the ionosphere and atmospheric layer at the observational point, which will lead to a deterioration of measurement accuracy.

On the other hand, in order to make it possible that the rover station M2 refers to correction data of the base station M1, it is necessary to transmit the correction data to the rover station M2 from the base station M1. This transmission requires a device that transmits the data from the base station M1 by a radio transmission of a specified frequency. Because of this, the base station M1 is provided with a transmission device (a transmitter Se having the output power of about 10 mW and the frequency of 400 MHz, for example), to always transmit the correction data. A radio receiver Sc capable of receiving the radio waves from the transmitter Se is installed on the side of the rover station M2, so that the rover station M2 can refer to the correction data transmitted.

As shown in FIG. 2, there is a well known satellite positioning system using a satellite positioning data server Dsb as data transmission/reception media.

Connected to the satellite positioning system, by way of the GPS positioning data server Dsb, are at least one rover station M2, a plurality of base stations M1 and M1', and communication devices Sx and Sy that establish communications between the rover station M2 and the base stations M1 and M1'.

In the satellite positioning system, as a common practice, the base stations M1 and M1' are fixedly located at positions whose coordinates are already known. The base stations M1 and M1' receive radio waves from the artificial satellite Sa continuously or periodically, and acquire the correction data of the positions in which they are located.

The measured correction data are transmitted continuously or periodically to the GPS positioning data server Dsb by the communication device Sx. For this purpose, the following is the necessary conditions: the communication device Sx as the communication interface transmits the correction data at a high speed, and includes the base stations M1 and M2' that are located fixedly at already known positions. Accordingly, the communication device Sx as the communication interface is used in continuous connection with an exclusive network such as the WAN.

When the correction data are delivered by radio, the radio frequencies used for transmitting the correction data are generally set to be different at each of the base stations M1 and M1'. The reason is that when the radio coverage borders are adjacent, the base stations are difficult to be identified, which causes a measurement error. When the radio coverage area has an overlap, there occur radio interferences in the overlapped area. In this case, a description is made of two base stations M1 and M1'. However, the same description holds good for over three base stations.

When there is a plurality of base stations to be referred to (M1 and M1', for example), the radio transmitters M11 thereof are set to individually different frequencies. Therefore, it becomes necessary to adjust the reception frequency of the rover station M2 in accordance with the base station used. Referring to the survey task plan, a desirable base station is generally selected among the base stations M1, M1', ..., and the frequency of the desirable base station is checked and adjusted before the task. Accordingly, when the rover station M2 moves over a referable area of a base station (M1, for example) into a referable area of another base station (M1', for example), the rover station M2 is bound to refer to the base stations M1, M1', . . . , which are different.

Therefore, the task should be always performed recognizing the relationship between the current position of the rover station M2 and the position of the base station (M1 or M1', etc.), which is inconvenient.

Among the correction data delivered from the base stations M1, M1', . . . , a base station should be selected that is usable based on the number of satellites common to the base stations and rover stations and is in good condition for receiving the artificial satellite Sa. Then, the reception frequency should be appropriately set in accordance with the selected base station. This is also inconvenient.

Further, in the case of a radio transmission, the communication is confined to one direction from the base stations M1, M1', . . . , to the rover station M2. Therefore, it is impossible to receive or transmit bi-directional data such as data for checking the condition of the rover station M2 from the base station M1. This is also inconvenient.

In the case of the Internet, there is a possibility of illegal access to the use of the network.

Further, in case of a communication through a network, fixed addresses are needed to choose a communication partner. The fixed use of the IP address is finite, and obtaining it is limited and expensive.

In case of using a general provider, the IP address is dynamic and is modified at each access; therefore, the IP address cannot be used as a fixed address in selecting to connect a partner, which is inconvenient.

The present system only needs an inherent ID in the IP-VPN, and it is possible to use an inherent number for a machine ID as an address and to designate a connection destination.

The indirect observation method based on the public survey task manual (Geographical Survey Institute of Japan, technical data A1-No. 228, June 2000, http//psgsv.gsi.go.jp/koukyou/rtk_manual/htm/mokuji.htm) requires delivering the correction data from one base station to two rover stations. Therefore, the task cannot be performed through a cellular phone network, which is inconvenient.

For the foregoing reasons, there is a need for a survey system that can overcome the inconveniences.

SUMMARY OF THE INVENTION

The present invention is directed to an RTK-GPS survey system that satisfies this need, and provides an RTK-GPS survey system capable of selecting a base station with less interference.

A first aspect of the RTK-GPS survey system for performing an RTK-GPS survey comprises a server in an IP-VPN communication network for establishing communications between a plurality of satellite positioning devices as base station and a plurality of satellite positioning devices as rover stations, the base station transmitting correction data, the rover station receiving the correction data. The satellite positioning devices each includes at least a satellite positioning unit for receiving radio waves from artificial satellites, a communication unit for performing communications between the satellite positioning devices, and a control unit for controlling the satellite positioning unit and the communication unit; and the control unit of the rover station is capable of receiving interference information registered in the control unit of each satellite positioning device of the base stations, and selecting a base station for transmitting most appropriate correction data among the plurality of base stations.

A second aspect of the RTK-GPS survey system for performing an RTK-GPS survey comprises a server in an IP-VPN communication network for establishing communications between a plurality of satellite positioning devices as base station and a plurality of satellite positioning devices as rover stations, the base station transmitting correction data, the rover station receiving the correction data. The satellite positioning devices each includes at least a satellite positioning unit for receiving radio waves from artificial satellites, a communication unit for performing communications between the satellite positioning devices, and a control unit for controlling the satellite positioning unit and the communication unit; and the control unit of the base station includes an estimate device for estimating an area in a sky map in which an S/N ratio of a received signal is lower than a reference value, and the control unit of the rover station removes correction data based on the radio waves from artificial satellites existing in the area in the sky map to perform an RTK-GPS processing.

BRIEF DESCRIPTION OF THE DRAWINGS

These and other features, aspects, and advantages of the present invention will become better understood with regard to the following description, appended claims, and accompanying drawings.

DETAILED DESCRIPTION OF THE INVENTION

Preferred embodiments of the present invention will be described hereunder with reference to the appended drawings.

EMBODIMENT 1

Figure 3:
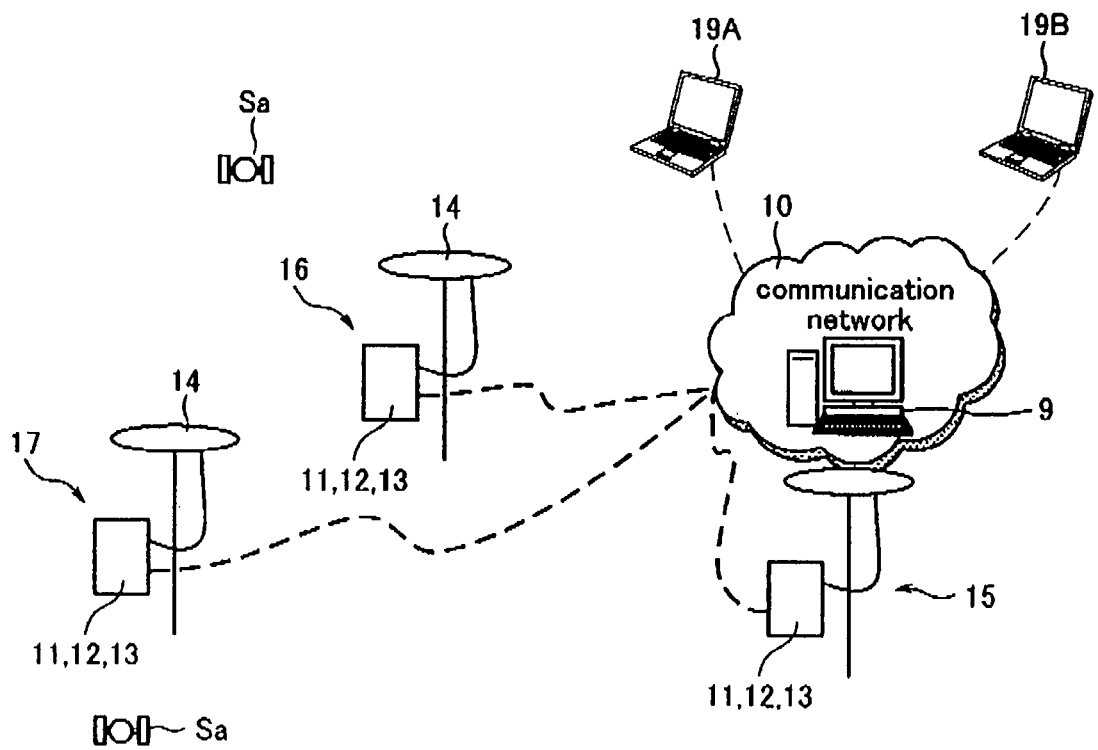
FIG. 3 is an explanatory view of illustrating one embodiment of an RTK-GPS survey system of the present invention.

FIG. 3 is a whole configuration map illustrating an outline of the RTK-GPS survey system of the embodiment 1 relating to the present invention.

The satellite positioning system includes a plurality of observational stations 15, 16 and 17 as a satellite positioning device capable of performing the RTK-GPS survey and one server 9 in a communication network 10.

At least one of the observational stations is used as a base station that transmits correction data for the analysis and processing of measured locations, and at least one of the rest of the observational stations is used as a rover station that receives the correction data.

Figure 4:
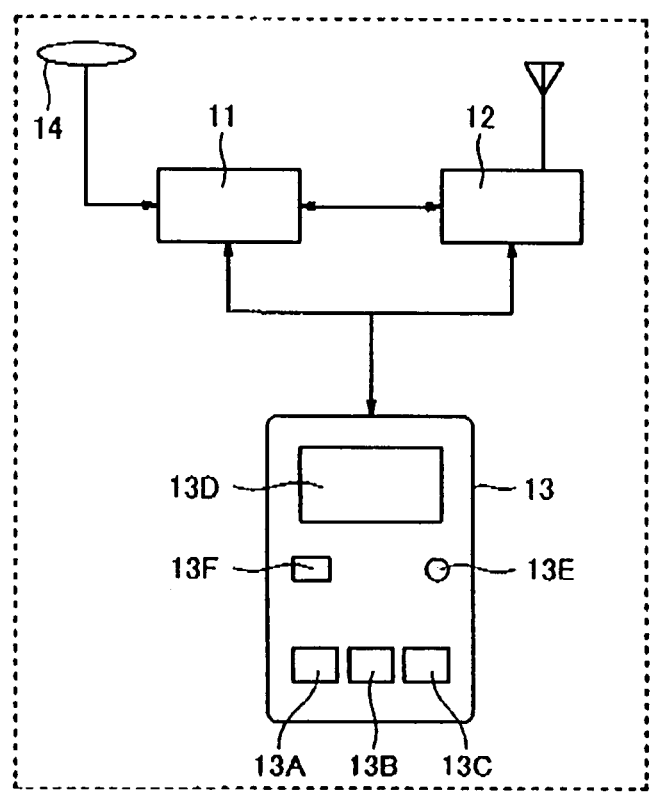
FIG. 4 is a block diagram illustrating a configuration of a satellite positioning device used for the RTK-GPS survey system of the present invention.

As shown in FIG. 4, each observational station includes a satellite positioning unit 11 that seeks the positional coordinates of its own by receiving the radio waves from the artificial satellite Sa, a communication unit 12 that performs communications between the observational stations, and a control unit 13 that controls the satellite positioning unit 11 and the communication unit 12. In FIGS. 3 and 4, a reference numeral symbol 14 denotes a GPS antenna that receives the radio waves from the artificial satellite Sa.

The control unit 13 includes a communication button 13A, a switch button 13B, a designation button 13C, and a display 13D. The firmware function incorporated into the control unit 13 may display a switch function button on the display 13D to thereby perform switching.

The control unit 13 includes a hand-held PC. The control unit 13 has the function of setting and controlling the GPS receiver of the satellite positioning unit 11, and the function of setting and controlling the communication unit 12.

The satellite positioning unit 11 generally uses four or more artificial satellites Sa to perform the position analysis, but is not restricted to this.

The communication unit 12 has the function of transmitting, by the packet communication, the correction data wherein reception data from the artificial satellite Sa and already-known positional coordinates are combined (data of the so-called CMR or RTCM format, for example).

The satellite positioning unit 11, communication unit 12, and control unit 13 are compactly integrated into one body.

FIG. 3 illustrates three observational stations 15, 16 and 17. It is assumed that one of the three is used as a rover station 15, and that the remaining two are used as base stations 16, and 17.

The satellite positioning unit 11 performs the function of seeking the positional coordinates of its own by receiving the radio waves from the artificial satellite Sa. The communication unit 12 performs the function of communicating between the observational stations through the server 9.

An ID inherent to each of the observational stations is assigned to each communication unit 12, and the ID inherent to each communication unit 12 is registered in the server 9 to correspond with each observational station. The server 9 has the function of registering IDs and authentication.

The communication network 10 is an IP-VPN in this embodiment, and each communication unit is a mobile cellular phone network as a radio transmitter-receiver. The inherent ID is a mobile cellular phone number, but may be a machine number inherent to each observational station.

In this embodiment, each communication unit 12 is connected to the communication network 10 through an IP communication network. In case of using the mobile cellular phone, each communication unit 12 is connected to the IP-VPN (internet protocol-virtual private network) by using a communication card for the mobile phone network. The IP-VPN is a service by which the public circuit can be used like a dedicated line, which is a well-known technique. That is, the IP-VPN is a VPN built up through a wide area IP network that a communication common carrier holds. By way of the IP-VPN, a remote network can be operated in the same manner as it is connected to a LAN. Using the Internet will build up a virtually dedicated line, which is protected by using the authentication technique and password technique.

The server 9 herein has the function of setting up a communication between one rover station 15 and the other two base stations 16 and 17.

The server 9 carries out the functions of delivering packet data as the correction data, transmitting control commands, recording data, authenticating log-in IDs, and monitoring the communication network 10.

Figure 5:
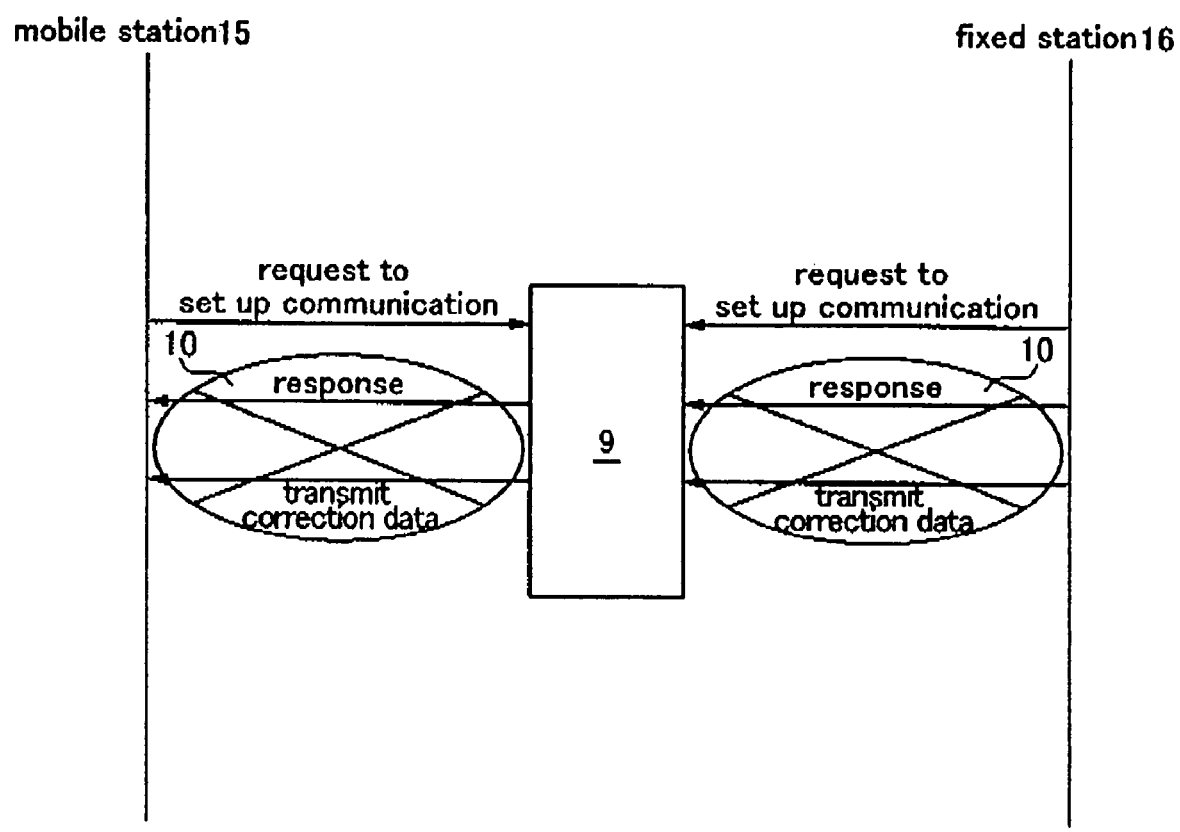
FIG. 5 is an explanatory view of one example of communication by the RTK-GPS survey system of the present invention.

As shown in FIG. 5, in this RTK-GPS survey system, when a communication setup request (ID inherent to a communication partner) is transmitted from the rover station 15 to the server 9 through the communication network 10 by pressing the communication button 13A, the server 9 authenticates the ID inherent to the rover station 15 that is the communication originator and permits the rover station 15 to log-in. At the same time, the server 9 searches the IDs inherent to the base stations 16 and 17 that are the communication partners, and establishes the communication between the base station 16 or the base station 17 and the rover station 15.

According to this RTK-GPS survey system, one rover station 15 can select either of the two base stations 16 and 17.

Because it utilizes the IP-VPN, the RTK-GPS survey system can enhance the communication speed as well as the security.

In this embodiment, there is one rover station located in the communication network 10, However, if the configuration is made such that a plurality of rover stations is located in the communication network 10, the ID inherent to each of the plural rover stations is registered in the server 9, and a selection device capable of selecting the base stations is provided to the control unit 13 of the observational station used as the rover station, a specified base station can be selected among the plural base stations, even when a plurality of rover stations are present.

One example of the RTK operational procedures will be described below.

(1) Initialization and setting of a base station is performed.

According to the general operational procedure of the RTK survey, an observational station is located at a reference point to perform setting operation of the base station.

In order to log-in to the communication network 10 and receive the authentication by the server 9, access to the communication network 10 is made through the communication unit 12 connected to the satellite positioning unit 11 of the base station.

The server 9 existing in the communication network 10 performs the authentication by using the ID inherent to the communication unit, and determines whether or not the access is permitted.

After setting the base station and completing the log-in to the communication network 10, delivering the correction data starts according to the request through the communication network 10.

(2) Initialization and setting of a rover station is performed.

According to the general operational procedure of the RTK survey, a rover station is located at a point whose positional coordinates are not yet known. Then, the initialization of the rover station is performed.

Based on the measurement plan, the rover station is located at the observational point. While receiving the radio waves from the artificial satellite Sa, the rover station performs positioning by itself. In general, the information on the positional coordinates acquired by this positioning by itself basically includes errors of 20-100 m.

Next, to log-in to the communication network 10 and receive the authentication by the server 9, access to the communication network 10 is made through the communication unit 12 connected to the satellite positioning unit 11 of the base station. At the moment, the server 9 existing in the communication network 10 performs the authentication by using the ID inherent to the communication unit, and determines whether or not the access is permitted.

(3) After setting the rover station and completing the log-in to the communication network 10, the base stations capable of delivering the correction data through the communication network 10 are displayed on the display 13D of the control unit 13. The operator of the rover station selects an observational station that he wants to preferably use as the base station among the plural observational stations displayed on the display 13D.

The correction data of the base station selected by the rover station are delivered to the rover station through the server 9 and the communication network 10.

(4) The rover station receives the correction data of the base station that are requested through the server 9. The analysis and processing device of the control unit 13 analyzes the correction data together with the data received by the rover station to thereby correct the errors. This produces precise positional information.

(5) This correction will achieve the positioning accuracy of about 10 mm. The achieved result is recorded in the data memory of the control unit 13 provided with the rover station. After completing the operation, the processing of a map creation is performed in other places.

As shown in FIG. 3, a centralized analysis and processing unit (centralized terminal unit) 19A is provided to the communication network 10, which analyzes on-line the positioning data acquired by the satellite positioning device used as the rover station. An ID inherent to the centralized analysis and processing unit 19A is assigned, and is registered in the server 9 to establish the communication between the centralized analysis and processing unit 19A connected to the communication network 10 and the rover station through the server 9. The positioning data acquired by the static observation using the rover station are transmitted to the centralized analysis and processing unit 19A through the server 9, and are analyzed by the centralized analysis and processing unit 19A. This enables the base line analysis and processing.

By providing the centralized analysis and processing unit 19A with the communication network 10, the base line analysis and processing becomes possible, without bringing back from a survey site to the office the observation materials of the satellite positioning unit 11, communication unit 12, and control unit 13 that make up the rover station, and without downloading the positioning data to the PC (personal computer).

Further, a centralized terminal unit 1913 is provided with the communication network 10, which updates a firmware to perform the function of the control unit 13. An ID inherent to the terminal unit 19B is assigned, and is registered in the server 9 to establish the communication between the terminal unit 19B connected to the communication network 10 and each observational station through the server 9. With this configuration, the version up of the firmware of the control unit 13 becomes possible. Such configuration may be the one that enables the version up of the firmware of the satellite positioning unit 11, or that enables the version up of the firmware of the communication unit 12.

In this embodiment, the control unit 13 of each satellite positioning device incorporates an electromagnetic interference creation program. The electromagnetic interference information by the electromagnetic interference creation program may be attained by manually inputting the current conditions, or may be automatically created on the basis of reception information and satellite orbit information. The electromagnetic interference information registered in each control unit 13 of the base stations 16 and 17 is transmitted to the communication unit 12 of the rover station 15 from each communication unit 12 of the base stations 16 and 17. The control unit 13 of the rover station 15 creates a sky map on the basis of the electromagnetic interference information transmitted from the base stations 16 and 17, and displays the sky map on the display 13D.

Figure 6A:
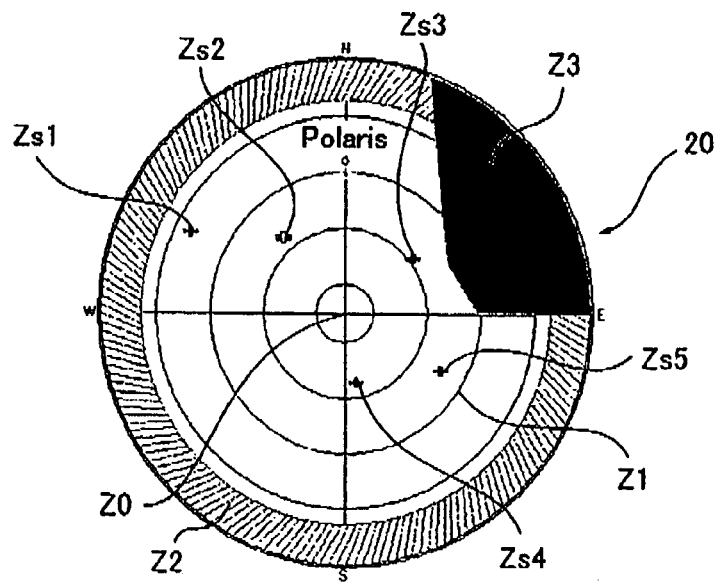
FIG. 6A is a sky map illustrating the information on coming artificial satellites in the sky over the rover station, displayed by the control unit of each satellite positioning device.
Figure 6B:
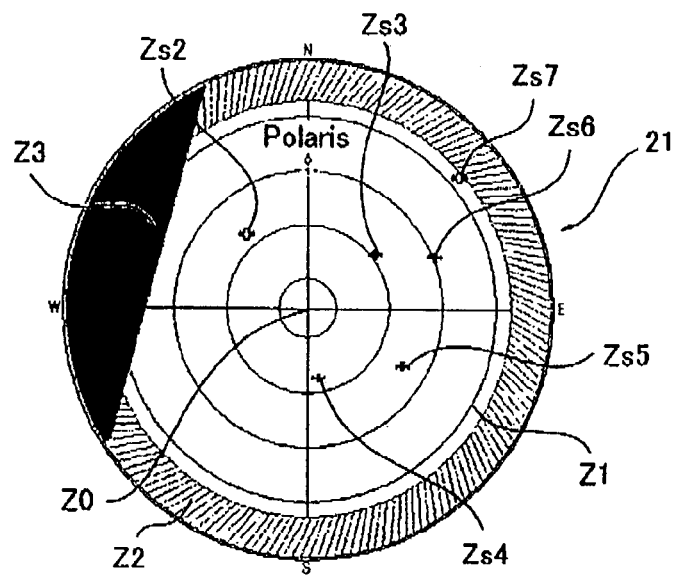
FIG. 6B is a sky map illustrating the information on coming artificial satellites in the sky over the base station, displayed by the control unit of each satellite positioning device.
Figure 6C:
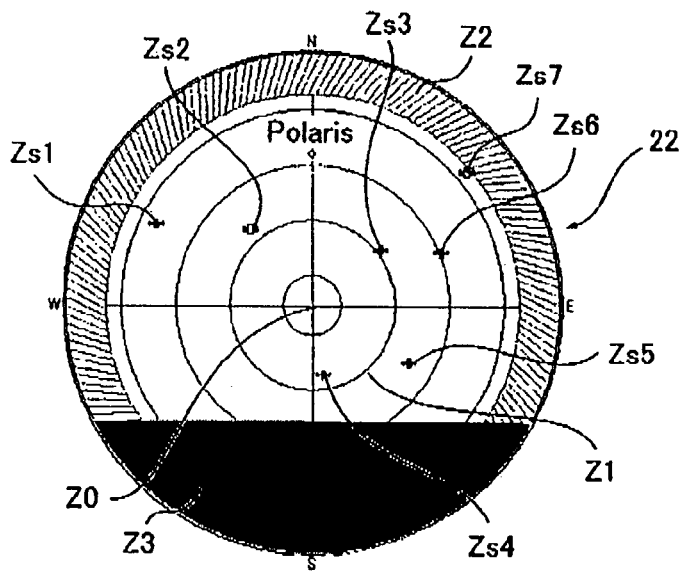
FIG. 6C is a sky map illustrating the information on coming artificial satellites in the sky over the base station different from the base station illustrated in FIG. 6B, displayed by the control unit of each satellite positioning device.

FIG. 6A, FIG. 6B, and FIG. 6C illustrate sky maps displayed on the display 13D of the rover station 15. FIG. 6A illustrates a sky map 20 created by the rover station 15 itself; FIG. 6B illustrates a sky map 21 of the base station 16, displayed on the display 13D of the rover station 15; and FIG. 6C illustrates a sky map 22 of the base station 17, displayed on the display 13D of the rover station 15.

These sky maps 20, 21, and 22 are displayed on the display 13D of the rover station 15 in a comparable manner.

In these sky maps 20 through 22, the symbol Z0 denotes the zenith at each observational point, the symbol Z1 denotes the altitude to the horizontal plane, the symbol Z2 denotes the ring-like mask that conceals an area below a predetermined altitude, the symbol Z3 denotes the area where exist electromagnetic interferences, and the symbol Zsi (i=1~n) denotes artificial satellites existing in the sky. The ring-like mask Z2 is used to prohibit the reception of radio waves from the artificial satellites existing in the so-called low altitude, because the radio waves coming from the artificial satellites existing in the low altitude contain much noises.

In the sky map 20 created by the rover station 15 exist the artificial satellites Zs1 through Zs5; in the sky map 21 created by the base station exist the artificial satellites Zs2, Zs3, Zs4, Zs5, and Zs6; and in the sky map 22 created by the base station exist the artificial satellites Zs1 through Zs7.

The operator compares the sky maps 20, 21, and 22 displayed on the display 13D of the rover station 15, and judges which one of the base stations 16 and 17 should be used. The operator selects the base station 17 that has the largest number of the common artificial satellites Zsi. In this example, the number of the artificial satellites of the rover station 15 is five, and the number of the common artificial satellites of the base station 17 is also five.

Thus, the control unit 13 of the rover station 15 receives the interference information registered in the control unit 13 of each satellite positioning device of the base stations 16 and 17, and selects a base station with less electromagnetic interferences out of the plural base stations 16 and 17. This is performed by pressing the designation button 13C, for example.

In case the number of the common satellites is the same, the selection is made on the ground that which one of the base stations 16 and 17 has more artificial satellites of higher reception strength, and that which one of the base stations 16 and 17 is nearer to the rover station 15.

No matter which one of the base stations is selected, when the number of the artificial satellites for performing the analysis and processing by the RTK survey is insufficient compared with the number of the artificial satellites displayed at the rover station 15, the RTK survey should be carried out during a time zone when the number of the artificial satellites appearing in the sky becomes the largest, because the time zone can be obtained from the relation between the appearance estimate of the artificial satellites and the electromagnetic interference information.

EMBODIMENT 2

FIG. 7 through FIG. 11 illustrate sky maps for describing the embodiment 2, in which the electromagnetic interference information is created by using a program for automatically creating the electromagnetic interference information.

Figure 1:
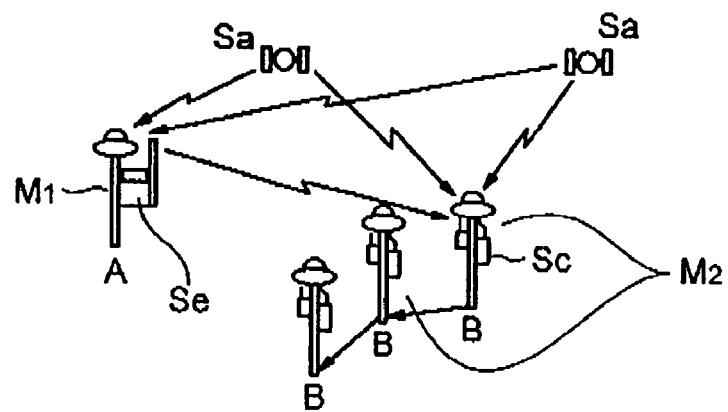
FIG. 1 is an explanatory view of illustrating one example of a conventional RTK positioning system.
Figure 2:
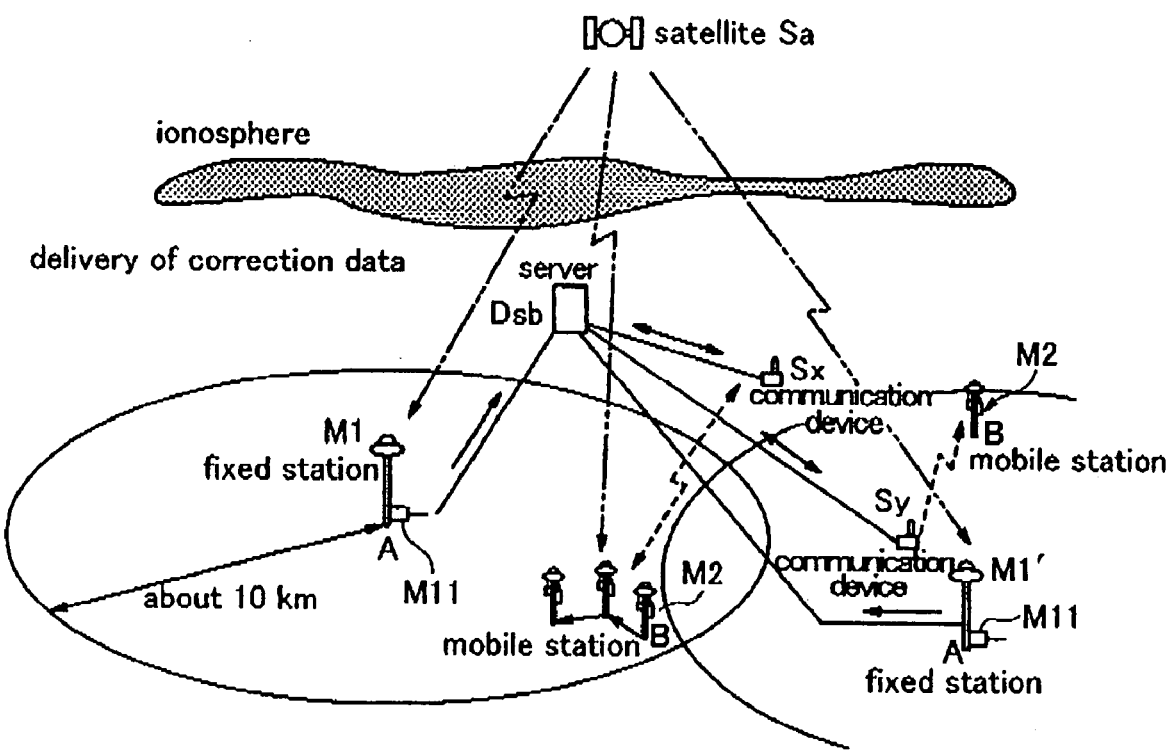
FIG. 2 is an explanatory view of describing inconveniences of the conventional RTK positioning system.

While the base station 16 or the base station 17 is located at one and the same observational point A (refer to FIG. 2) continuously over 12 hours, each satellite positioning unit 11 receives the radio waves from the artificial satellites. The artificial satellite used for the survey orbits once for about 12 hours, in case of a GPS satellite.

Therefore, the orbit of the artificial satellite can be found, by receiving the radio waves transmitted from the artificial satellite passing the sky at the same observational point over 12 hours.

Figure 7:
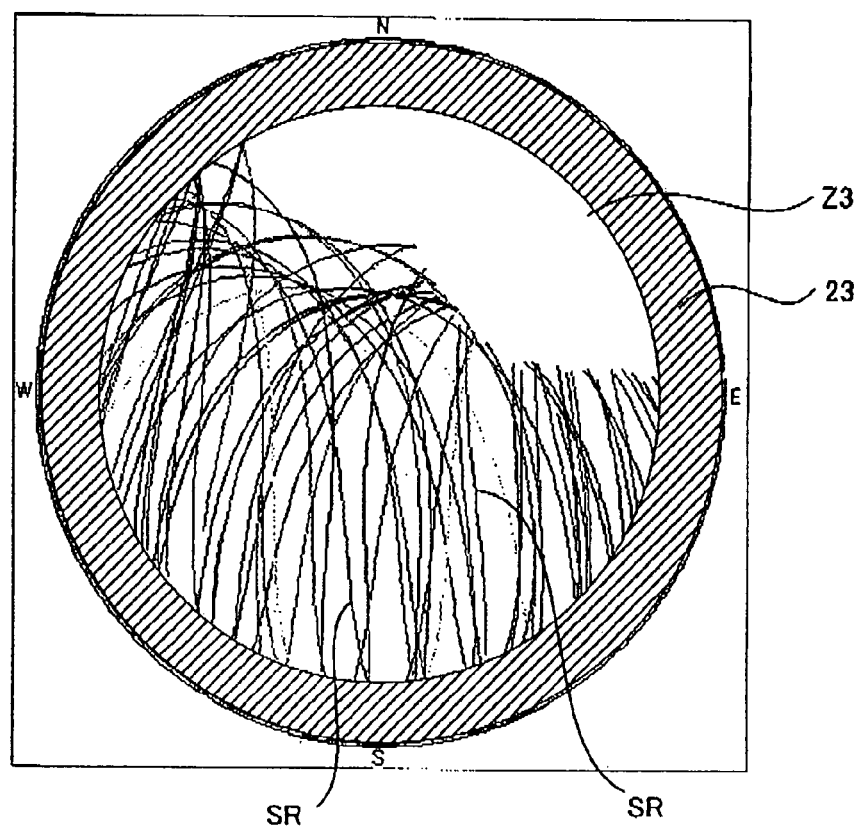
FIG. 7 is a sky map illustrating the orbits of artificial satellites that actually come in the sky over the base station.

FIG. 7 draws an orbit SR of the artificial satellite Sa in the sky map 23, which is created by the program for automatically creating the electromagnetic interference information incorporated in the control unit 13 of the base station 16 (or the base station 17) located at a certain observational point (in this case, the observational point A, for example). The multiple striae are drawn as the orbit SR in this drawing., because there are multiple artificial satellites Sa passing the sky.

Figure 8:
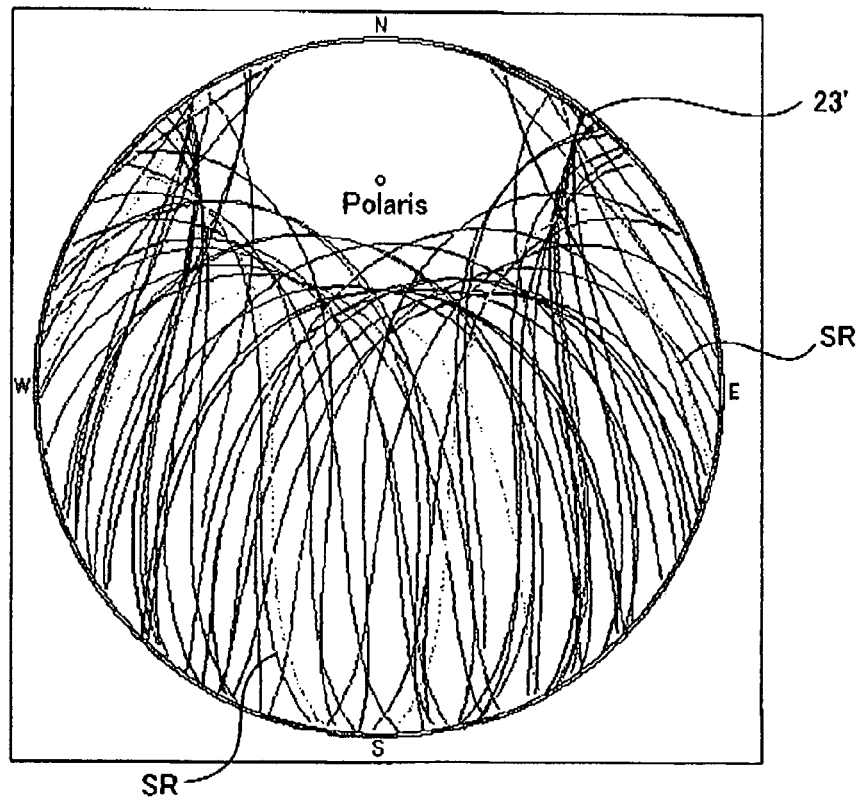
FIG. 8 is a sky map illustrating the orbits of artificial satellites that are estimated to come in the sky over the base station.

On the other hand, the orbit can be attained by the arithmetic operation of the orbit of each artificial satellite, based on the calendar information of each artificial satellite Sa and the positional information of the base station 16 (or the base station 17) placed at the observational point. It is assumed that the orbit in the sky map 23' of each artificial satellite attained by using the program for automatically creating the electromagnetic interference information is one illustrated in FIG. 8. FIG. 8 shows an original orbit SR drawn in the sky map 23 in case any electromagnetic interference does not exist, when the base station 16 or the base station 17 is located at the observational point A. On the other hand, FIG. 7 shows the sky map 23 of the actual observation result, which does not draw the right upper part of the striae of the orbit SR.

Figure 9:
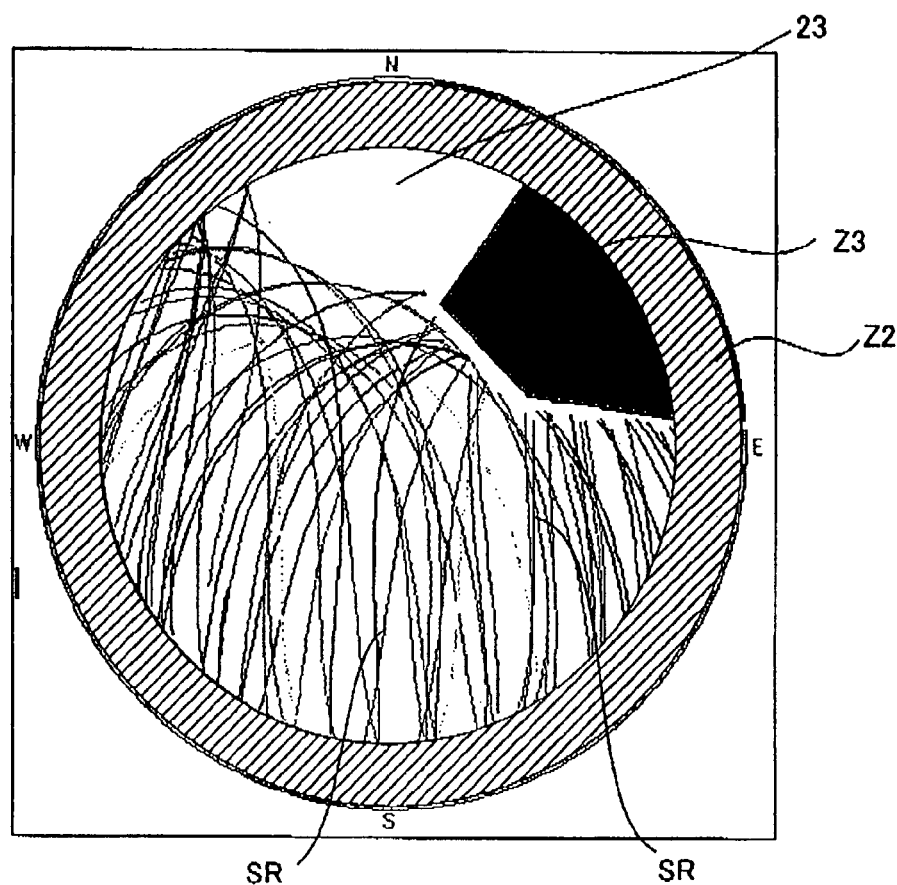
FIG. 9 is a sky map illustrating a state wherein a ring-like mask illustrated in FIG. 7 is applied.

As shown in FIG. 9, the already mentioned ring-like mask Z2 is applied to the sky map 23. In view of the ring-like mask, in the sky map 23 as shown in FIG. 7 exists an area where the radio waves from the satellite Sa cannot be received, that is, the electromagnetic interference area Z3. This can be understood by contrasting the sky map 23 shown in FIG. 7 with the sky map 23' shown in FIG. 8.

Figure 10:
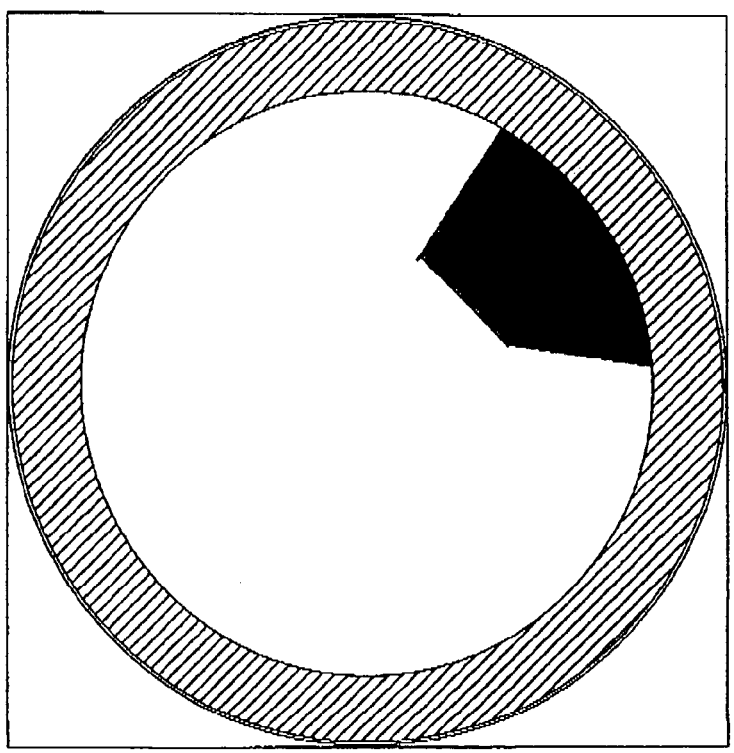
FIG. 10 is a sky map with the interferences that are acquired from the sky map illustrated in FIGS. 8 and 9.

Therefore, by the program for automatically creating the electromagnetic interference information is attained the actual orbit of each artificial satellite Sa passing in the sky over the base station located at a certain observational point as well as the estimated orbit of each artificial satellite Sa at the observational point of each artificial satellite. The size and shape of the electromagnetic interference area Z3 in the sky map 23 acquired by the actual measurement at the certain observational point can be estimated, as shown in FIG. 10, by the difference between the actual orbit and the estimated orbit.

The program for automatically creating the electromagnetic interference information makes the control unit 13 of the base station store the electromagnetic interference area Z3 thus attained. In response to a request from the rover station 15, the control unit 13 of the base station transmits the electromagnetic interference information.

Accordingly, the sky map 23 automatically attained at the base station is displayed on the display 13D of the rover station 15. According to this, the rover station 15 can determine whether or not the base station should be used, by contrasting the sky map 20 created by itself with the sky map 23 transmitted to the base station.

In this embodiment 2, the actual orbit of each artificial satellite Sa is displayed on the display 13D of the control unit 13 of the base station. However, it is not necessary to display the orbit information of the automatically attained artificial satellite on the display 13D of the base station. It is sufficient to store the electromagnetic interference information in the memory of the control unit 13 of the base station and transmit the electromagnetic interference information in response to the request from the rover station.

EMBODIMENT 3

Figure 11:
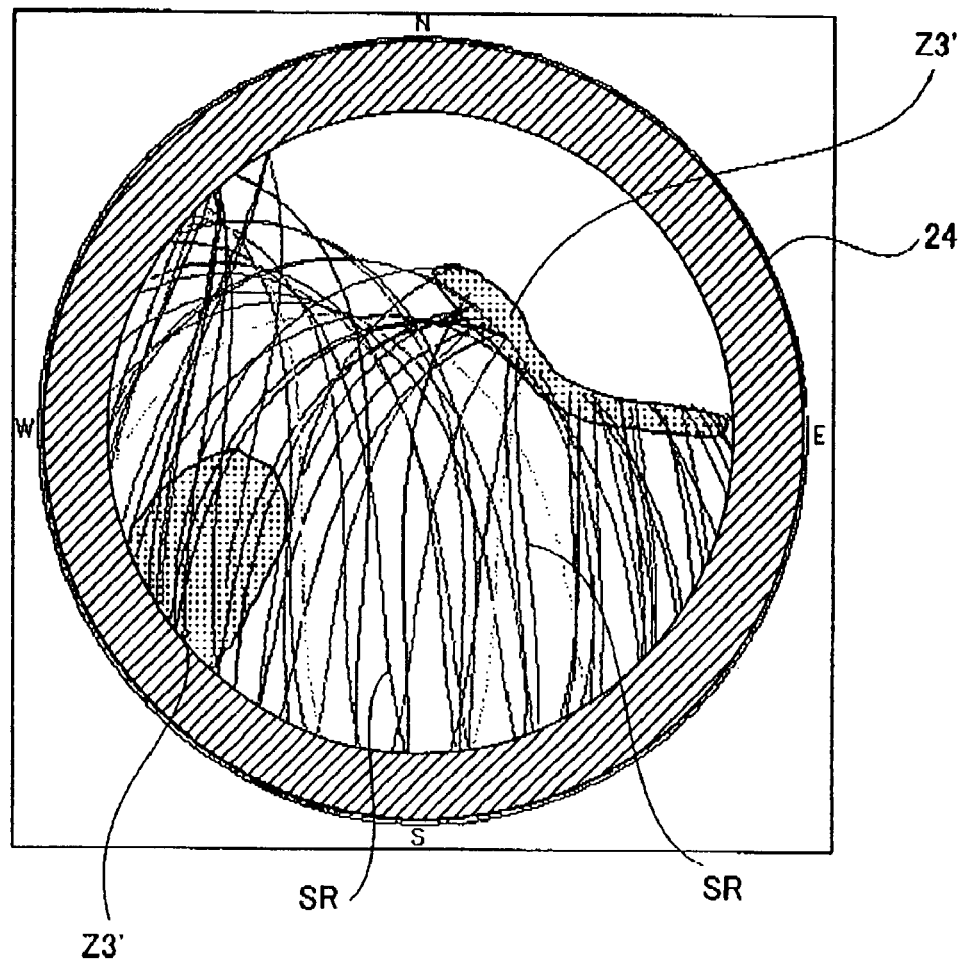
FIG. 11 is a sky map illustrating a noise interference area.

FIG. 11 shows a sky map 24 which displays a noise interference area (hereunder, referred to as a high noise interference area), in which noise over a predetermined S/N ratio is superposed on the received radio waves.

As the radio waves from the artificial satellite Sa pass a shield (a region where buildings stand disorderly, for example), multi-path phenomenon arises. Due to this multi-path phenomenon, the base station is bound to receive the radio waves from the artificial satellite Sa, on which high noise is superposed.

The radio waves containing high noise hinder the RTK survey. Accordingly, the system of this embodiment 3 incorporates a noise analysis program (noise interference area estimate program) into the control unit 13 of the base station, and makes the control unit 13 analyze the noise contained in the radio waves actually coming from the artificial satellite Sa to obtain a S/N ratio at each position on each orbit SR in the sky map 20. The system specifies a noise interference area Z3' whose S/N ratio is lower than a reference value, as shown in FIG. 11. The reference value may be set to an appropriate value for each satellite reception altitude. Alternatively, the system may also obtain the reference value based on the S/N ratio of all the satellites from which it actually receives the radio waves.

The base station (base station 16, for example) transmits the S/N ratio=ea information on the noise interference area Z3' to the rover station (rover station 15, for example), An operation program, which calculates the satellite number passing the noise interference area Z3' and the time zone thereof from the coming information (history information) of the artificial satellite Sa, is incorporated in the control unit 13 of the rover station. The radio waves from the artificial satellite passing the noise interference area Z3' are set not to be used in the RTK survey.

If the control unit 13 of the rover station is configured in this way, the rover station will not perform the RTK survey using the radio waves from the artificial satellite passing the noise interference area Z3', even if the correction information transmitted from a selected base station contains the radio waves from an artificial satellite passing the noise interference area Z3'.

Therefore, even if the correction information transmitted from the selected base station contains the radio waves from the artificial satellite passing the noise interference area Z3', it is possible to estimate in advance the correction information containing high noises due to buildings and trees. As a result, a precise RTK survey can be realized by using only good quality correction information.

The simultaneous use of the information on the electromagnetic interference area Z3 and the information on the noise interference area Z3' will provide the following usage.
(1) The rover station acquires the information on the electromagnetic interference area Z3 and the information on the noise interference area Z3' at the observational point of each base station. On a better condition, namely, with the noise interferences removed, an observational point can be selected as the base station to be referred to during observation in the RTK survey.
(2) The setting can be made not to use the radio waves from the artificial satellite passing the noise interference area Z3' for the RTK analysis and processing,
(3) The positional information of the base station, the information on the electromagnetic interference area 13, and the information on the noise interference area Z3' can be stored in the memory of the control unit of the base station, and be delivered in response to the request from the rover station.
(4) The positional information of the base station, the information on the electromagnetic interference area Z3, and the information on the noise interference area Z3' are transmitted from the base station to the server 9 to be stored therein. The server 9 can deliver the information in response to the request from the rover station, so that the rover station can refer to the information.

According to this embodiment 3, the base station alone can automatically create the information on the electromagnetic interference area Z3 and the information on the noise interference area Z3'. A base station used for a long-term observation, like a permanent base station, can in real-time update the information on the electromagnetic interference area Z3 and the information on the noise interference area Z3', even if there are environmental changes around the base station on the basis of the environmental changes, such as enlargement or relocation of buildings, growth of trees due to seasonal changes.

According to the invention, since the control unit of the rover station is capable of receiving interference information registered in the control unit of each satellite positioning device of the base stations to select a base station with less interference among the plurality of base stations, a most appropriate base station can be selected so that the number of satellites common to the base stations and rover stations is the maximum.

According to the invention, the RTK survey task can be performed with interference noises removed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An RTK-GPS survey system for performing an RTK-GPS survey comprising:
a server in an IP-VPN communication network for establishing communications between a plurality of satellite positioning devices as base stations and a plurality of satellite positioning devices as rover stations, the base station transmitting correction data, the rover station receiving the correction data, wherein:
the satellite positioning devices each includes at least a satellite positioning unit for receiving radio waves from artificial satellites, a communication unit for performing communications between the satellite positioning devices, and a control unit for controlling the satellite positioning unit and the communication unit;
the control unit of the rover station is capable of receiving electromagnetic interference information registered in the control unit of the base stations, creates a sky map on the basis of the electromagnetic interference information, by contrasting the sky map created by itself with the sky map transmitted from the base station, and is able to select by pressing a designation button (13C) a base station with less electromagnetic interference out of the plurality of base stations; and
wherein an operation program, which calculates a satellite number passing a noise interference area and a time zone thereof, is incorporated in the control unit of the rover station, and radio waves from the artificial satellite passing the noise interference area are set not to be used in the RTK survey.

2. An RTK-GPS survey system for performing an RTK-GPS survey comprising:
a server in an IP-VPN communication network for establishing communications between a plurality of satellite positioning devices as base stations and a plurality of satellite positioning devices as rover stations, the base station transmitting correction data, the rover station receiving the correction data, wherein:
the satellite positioning devices each includes at least a satellite positioning unit for receiving radio waves from artificial satellites, a communication unit for performing communications between the satellite positioning devices, and a control unit for controlling the satellite positioning unit and the communication unit; and
the control unit of the base station includes an estimate device for analyzing a noise contained in radio waves actually coming from artificial satellites to obtain a S/N ratio at each position on each orbit in a sky map and estimating a noise interference area on the sky map whose S/N ratio of received signals is lower than a reference value, the control unit of the rover station removes correction data based on the radio waves from the artificial satellites existing in the noise interference area in the sky map to perform an RTK-GPS processing,
wherein an operation program, which calculates a satellite number passing the noise interference area and a time zone thereof, is incorporated in the control unit of the rover station, and radio waves from the artificial satellite passing the noise interference area are set not to be used in the RTK survey.

3. An RTK-GPS survey system according to claim 2, comprising:
a sky map creation device for creating sky maps of each satellite positioning device, wherein, on the sky maps created, there are displayed
a ring-like mask that conceals an area below a predetermined altitude,
an electromagnetic interference area Z3 where the radio waves from the artificial satellite Sa cannot be received,
a noise interference area Z3' whose S/N ratio is lower than a reference value, and artificial satellites existing in the sky.

4. An RTK-GPS survey system according to claim 2, wherein a program for automatically creating electromagnetic interference information is incorporated in each of the control units of the plurality of base stations, an actual orbit of each artificial satellite passing over a sky over the base station disposed in an observation point, as well as an estimated orbit of each artificial satellite at the observation point, are attained by said program for automatically creating electromagnetic interference information, and a size and shape of an electromagnetic interference area in a sky map acquired by an actual measurement at an observation point are estimated by a difference between the actual orbit and the estimated orbit by said program for automatically creating electromagnetic interference information.

* * * * *